United States Patent
Nakakura (10) Patent No.: US 11,610,343 B2
(45) Date of Patent: Mar. 21, 2023

(54) VIDEO DISPLAY CONTROL APPARATUS, METHOD, AND NON-TRANSITORY COMPUTER READABLE MEDIUM

(71) Applicant: NTT Communications Corporation, Tokyo (JP)

(72) Inventor: Toshiya Nakakura, Tokyo (JP)

(73) Assignee: NTT Communications Corporation, Tokyo (JP)

( * ) Notice: Subject to any disclaimer, the term of this patent is extended or adjusted under 35 U.S.C. 154(b) by 0 days.

(21) Appl. No.: 17/194,370

(22) Filed: Mar. 8, 2021

(65) Prior Publication Data

US 2021/0192805 A1     Jun. 24, 2021

Related U.S. Application Data

(63) Continuation of application No. PCT/JP2020/010533, filed on Mar. 11, 2020.

(30) Foreign Application Priority Data

Jul. 25, 2019   (JP) .............................. JP2019-137237

(51) Int. Cl.
  *G06T 11/00*    (2006.01)
  *G06F 3/01*     (2006.01)
(52) U.S. Cl.
  CPC ............ *G06T 11/001* (2013.01); *G06F 3/012* (2013.01)
(58) Field of Classification Search
  CPC ................................ G06T 11/001; G06F 3/012
  See application file for complete search history.

(56) References Cited

U.S. PATENT DOCUMENTS

| 7,918,781 B1* | 4/2011 | Smyth ................... A61M 21/00 600/27 |
| 2002/0099257 A1 | 7/2002 | Parker et al. |

(Continued)

FOREIGN PATENT DOCUMENTS

| JP | 2004-233903 A | 8/2004 |
| JP | 2004-233904 A | 8/2004 |

(Continued)

OTHER PUBLICATIONS

Terzic, Kasim, and Miles Hansard. "Methods for reducing visual discomfort in stereoscopic 3D: A review." Signal Processing: Image Communication 47 (Aug. 6, 2016): 402-416. (Year: 2016).*

(Continued)

*Primary Examiner* — Yu Chen
(74) *Attorney, Agent, or Firm* — Oblon, McClelland, Maier & Neustadt, L.L.P.

(57) ABSTRACT

A video display control apparatus receives a video content generated by a control target device in accordance with a control operation of a user via a network and displays the received video content on a head mount display attached to the user. The video display control apparatus includes a detection unit that detects a change in a direction of face or line of sight related to the control operation and a first display control unit that generates an auxiliary pattern in which at least one of a display position and a display form changes so as to follow the detected change in the direction of the face or the line of sight related to the control operation, superimposes the auxiliary pattern on the video content, and displays the video content on the head mount display.

10 Claims, 6 Drawing Sheets

(56) References Cited

U.S. PATENT DOCUMENTS

| | | | |
|---|---|---|---|
| 2006/0119539 A1 | 6/2006 | Kato et al. | |
| 2009/0243970 A1 | 10/2009 | Kato et al. | |
| 2014/0009489 A1* | 1/2014 | Tucker | A61B 3/032 345/593 |
| 2016/0131908 A1* | 5/2016 | Fateh | G06F 3/016 345/633 |
| 2016/0282619 A1 | 9/2016 | Oto et al. | |
| 2016/0284048 A1 | 9/2016 | Rekimoto et al. | |
| 2016/0301865 A1 | 10/2016 | Rekimoto et al. | |
| 2017/0075417 A1 | 3/2017 | Asami | |
| 2017/0111636 A1* | 4/2017 | Hasegawa | G06T 7/285 |
| 2017/0228855 A1* | 8/2017 | Bates | G06F 3/011 |
| 2017/0278262 A1* | 9/2017 | Kawamoto | H04N 5/23238 |
| 2018/0108110 A1* | 4/2018 | Cuervo | G06T 15/20 |
| 2018/0182273 A1 | 6/2018 | Hwang et al. | |
| 2018/0192058 A1* | 7/2018 | Chen | H04N 19/119 |
| 2019/0049728 A1 | 2/2019 | Oto et al. | |
| 2019/0075269 A1 | 3/2019 | Nashida | |
| 2019/0172410 A1 | 6/2019 | Okumura | |
| 2019/0349525 A1 | 11/2019 | Rekimoto et al. | |
| 2020/0197825 A1* | 6/2020 | Bear | H04N 7/157 |
| 2020/0319463 A1 | 10/2020 | Nakamura | |
| 2021/0065427 A1* | 3/2021 | Wade | H04N 13/388 |

FOREIGN PATENT DOCUMENTS

| | | |
|---|---|---|
| JP | 2017-054457 A | 3/2017 |
| JP | 2017-195552 A | 10/2017 |
| JP | 2018-106157 A | 7/2018 |
| JP | 2018-157319 A | 10/2018 |
| JP | 2018-206029 A | 12/2018 |
| JP | 2019-106628 A | 6/2019 |
| WO | WO 2015/068656 A1 | 5/2015 |
| WO | WO 2015/122108 A1 | 8/2015 |
| WO | WO 2018/216539 A1 | 11/2018 |

OTHER PUBLICATIONS

Buhler, H., Misztal, S., Schild, J.: Reducing VR sickness through peripheral visual effects. In: IEEE Conference on Virtual Reality and 3D User Interfaces (VR), Reutlingen, pp. 517-519 (2018) (Year: 2018).*

International Search Report dated May 26, 2020 in PCT/JP2020/010533 filed on Mar. 11, 2020, 3 pages.

Japanese Office Action dated Oct. 29, 2019 in Japanese Patent Application No. 2019-137237 (with unedited computer generated English translation), 6 pages.

Decision to Grant dated Jan. 7, 2020 in Japanese Patent Application No. 2019-137237 (with unedited computer generated English translation), 5 pages.

International Preliminary Report on Patentability and Written Opinion dated Feb. 3, 2022 in PCT/JP2020/010533, 5 pages.

Extended European Search Report dated Jun. 15, 2022 in European Patent Application No. 20844303.6, 11 pages.

* cited by examiner

VIDEO DISPLAY CONTROL APPARATUS, METHOD, AND NON-TRANSITORY COMPUTER READABLE MEDIUM

CROSS-REFERENCE TO RELATED APPLICATION

This application is a Continuation Application of PCT Application No. PCT/JP2020/010533, filed Mar. 11, 2020 and based upon and claiming the benefit of priority from the prior Japanese Patent Application No. 2019-137237, filed Jul. 25, 2019, the entire contents of all of which are incorporated herein by reference.

BACKGROUND

One aspect of the present invention relates to, for example, a video display control apparatus, a method, and a non-transitory computer readable medium storing a program for displaying a video transmitted from a remote place.

There have been developed systems in which a user wears a head mount display (HMD) (hereinafter also referred to as a headset) on the head and controls a control target while watching a video displayed on the headset. An example for the above system is, a system in which a user remotely controls the motion of a robot in a remote location by moving its body while watching a video captured by the robot on a headset, a system in which a user plays a game through operation of a controller while watching a game video sent from a web site or a game machine on the headset, and the like.

In this kind of system, augmented reality (AR) technology or virtual reality (VR) technology is generally used so that an AR video or VR video is displayed on the headset. At that time, so-called tracking control is performed in which the displayed video changes according to the motion of the user's head. As a result, the user can get a high immersive feeling during the operation.

On the other hand, however, there is a drawing delay (latency) from the generation to display of the AR video or VR video. The drawing delay (latency) includes a transmission delay that might occur when a VR video generated by an apparatus in a remote location is transmitted to an apparatus with the headset via a network. Moreover, this transmission delay is not constant, and the amount of delay changes depending on, for example, the degree of network congestion and the fluctuation in the load on the processor in each apparatus. For this reason, there arises a discrepancy between the direction of the user's head as of the time of image generation and the direction of the user's head with the image displayed on the headset, and the user may feel sick, that is, may suffer sickness called "virtual reality (VR) sickness" or the like. The VR sickness occurs even when the delay amount is constant, but becomes particularly remarkable when the delay amount of the transmission delay includes so-called jitter that causes time fluctuation.

Therefore, in order to reduce the influence of the time difference from the generation to display of the image described above, there has been proposed, for example, a technique for performing reprojection processing on the video by the apparatus with the headset (see, for example, Jpn. Pat. Appln. KOKAI Publication No. 2019-106628).

SUMMARY

According to one aspect of the present invention, a video display control apparatus that receives a video content generated by a control target device in accordance with a control operation of a user via a network and displays the received video content on a head mount display attached to the user includes a detection unit and a first display control unit. The detection unit detects a change in a direction of face or line of sight related to the control operation of the user. The first display control unit generates an auxiliary pattern in which at least one of a display position and a display form changes so as to follow the detected change in the direction of the face or the line of sight related to the control operation of the user, superimposes the auxiliary pattern on the video content, and displays the video content on the head mount display.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Hereinafter, embodiments according to the present invention will be described with reference to the drawings.

First Embodiment

Configuration Example (1) System

Figure 1:
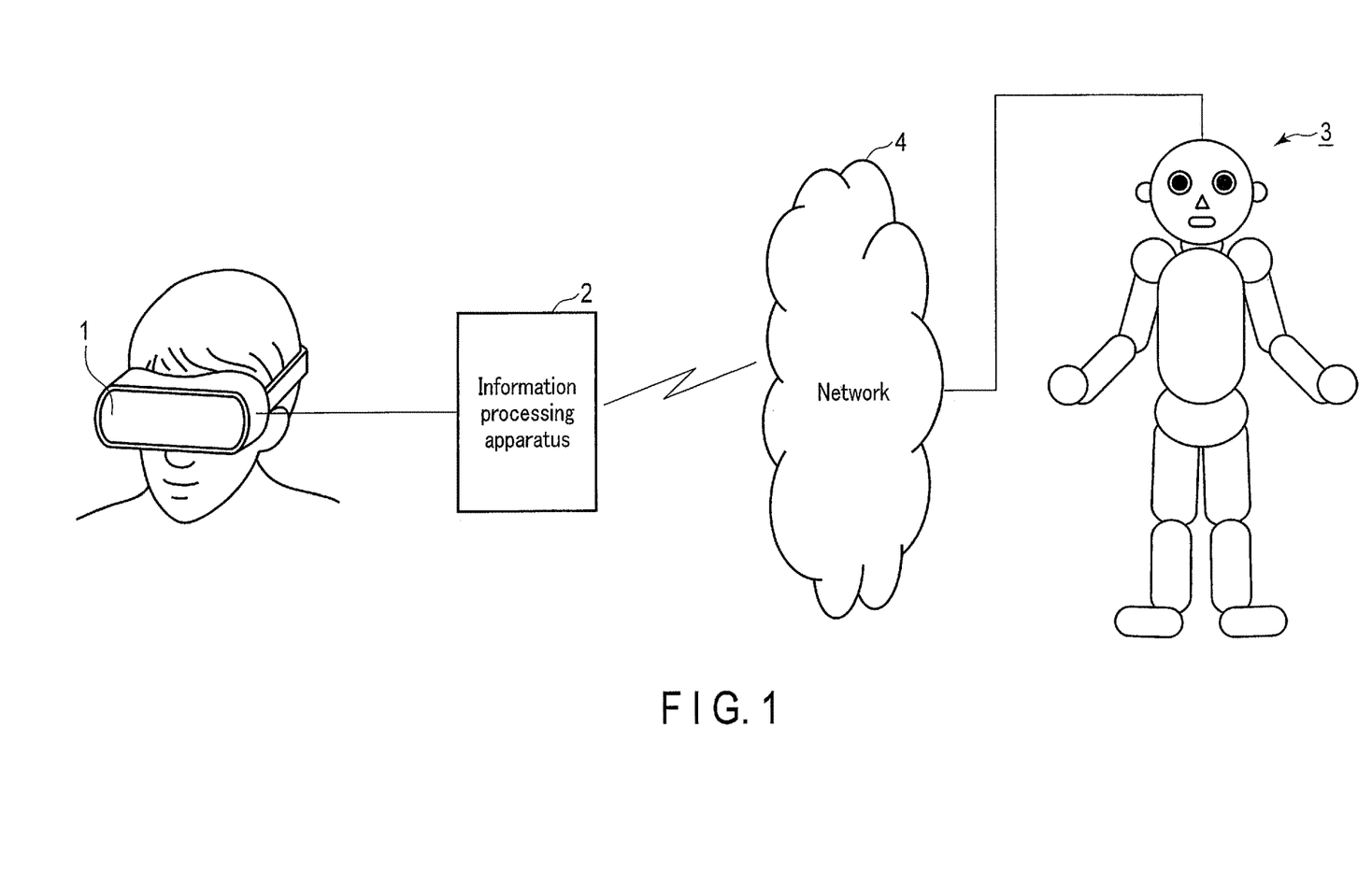
FIG. 1 is a diagram illustrating an overall configuration of a remote control system including a video display control apparatus according to a first embodiment of the present invention.

FIG. 1 is a diagram illustrating an overall configuration of a remote control system including a video display control apparatus according to a first embodiment of the present invention.

The remote control system according to the first embodiment includes a head mount display (HMD) 1, an information processing apparatus 2 having a function as a video display control apparatus, and a control target device 3 capable of communication with the information processing apparatus 2 via a network 4.

The control target device 3 includes, for example, a humanoid robot operating in a remote location. The operations of the control target device 3 are remotely controlled according to a remote control signal sent from the information processing apparatus 2. The operations to be controlled include, for example, an operation of remotely controlling the orientation of a part of the humanoid robot corresponding to the face to variably control a monitoring target range to be imaged by a camera provided at the part.

In addition to the humanoid robot, the control target device 3 may be, for example, an industrial robot or a surveillance camera. The control target device 3 is not limited to hardware, but may be software. For example, the embodiment of the present invention also includes a case where, as in an online battle game, the user moves a character on a server by operating a user terminal and visually recognizes a VR video composited in the server on the user terminal.

The network 4 includes, for example, a public IP network such as the Internet and an access network for accessing the public IP network. The access network includes a local area network (LAN), wireless LAN, public wired network, and public mobile communication network, or cable television (CATV) network.

(2) Head Mount Display 1

The head mount display 1 has a goggle-like shape as illustrated in FIG. 1, and is detachably attached to the user's head.

Figure 2:
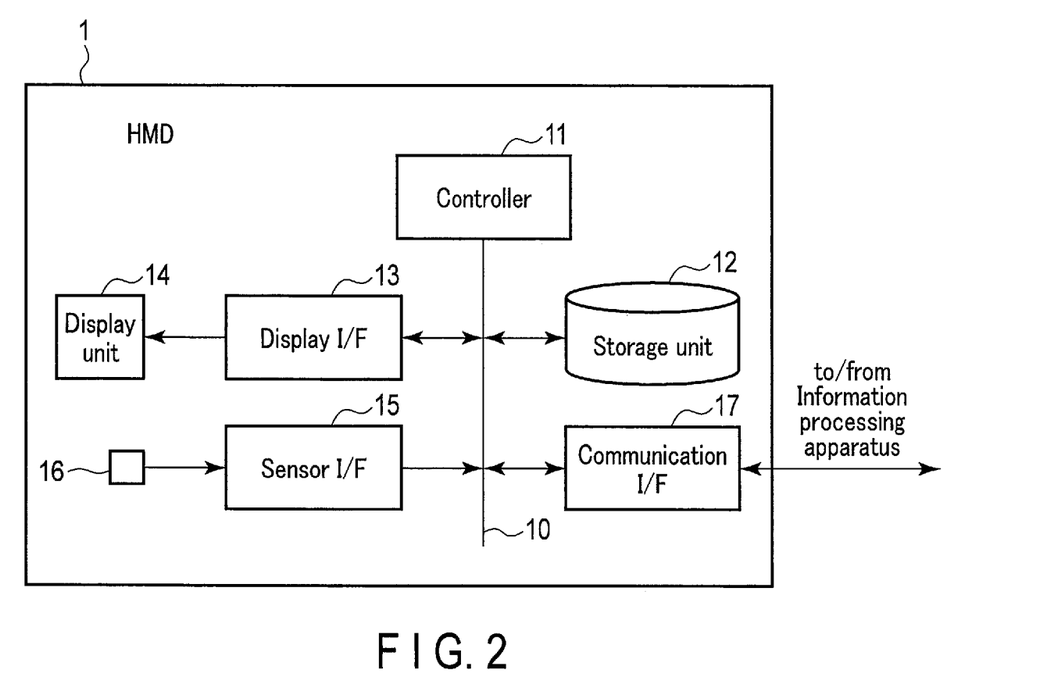
FIG. 2 is a block diagram illustrating a hardware configuration of a head mount display used in the system illustrated in FIG. 1.

The head mount display 1 includes a controller 11 as illustrated in FIG. 2, for example. The controller 11 has a hardware processor such as a central processing unit (CPU). A storage unit 12, a display interface (display I/F) 13, a sensor interface (sensor I/F) 15, and a communication interface (communication I/F) 17 are connected to the controller 11 via a bus 10. Other devices such as various switches, microphones, speakers, cameras, and position sensors may be connected to the controller 11.

The storage unit 12 uses a non-volatile memory such as a solid state drive (SSD) that can be written and read at any time as a storage medium, and has a program storage area and a data storage area. Various application programs for realizing the operations of the head mount display 1 are stored in the program storage area. The data storage area is used to store various data acquired or generated in the operation process of the head mount display 1. As the storage medium, a read only memory (ROM), random access memory (RAM), or the like can also be used in combination.

A display unit 14 is connected to the display I/F 13. The display unit 14 includes, for example, two display panels formed from organic electro luminescence (EL) displays, corresponding to the left and right eyes of the user in order to support virtual reality (VR) display. Only one display panel may be provided. The display unit 14 is not limited to the organic EL display but may be another type of display such as a liquid crystal display (LCD) or a 7-segment display, for example. The display I/F 13 causes the display unit 14 to display an image generated by the information processing apparatus 2 described later.

A sensor 16 is connected to the sensor I/F 15. The sensor 16 includes, for example, an angular velocity sensor (gyro sensor) and is used to detect the motion of the head mount display 1, that is, the motion of the user's head. Specifically, the sensor 16 detects the motion of the head in six-axis directions. The sensor I/F 15 generates motion data representing the motion of the user's head based on an output signal from the sensor 16. The sensor 16 may include a magnetic sensor, acceleration sensor, position sensor, infrared sensor, brightness sensor, proximity sensor, camera, or the like. The sensor 16 may also detect the motion of the user's line of sight in addition to the motion of the user's head. The motion of the user's line of sight can be detected, for example, by using a camera that captures an image of the user's eyeballs.

The communication I/F 17 is configured with a wired interface using a signal cable such as a universal serial bus (USB) cable under the control of the controller 11. The communication I/F 17 receives the video data transmitted from the information processing apparatus 2 and transfers the motion data and the like generated by the sensor I/F 15 to the information processing apparatus 2. The communication I/F 17 may use a short-range wireless data communication standard (for example, Bluetooth (registered trademark)).

In this example, as the head mount display 1, a multifunctional head mount display provided with a controller 11 and the storage unit 12 is described as an example. However, the head mount display 1 may be a standard type or a simple type head mount display having only the display unit 14, the display I/F 13, the sensor 16, the sensor I/F 15, and the communication I/F 17.

(3) Information Processing Apparatus 2

Figure 3:
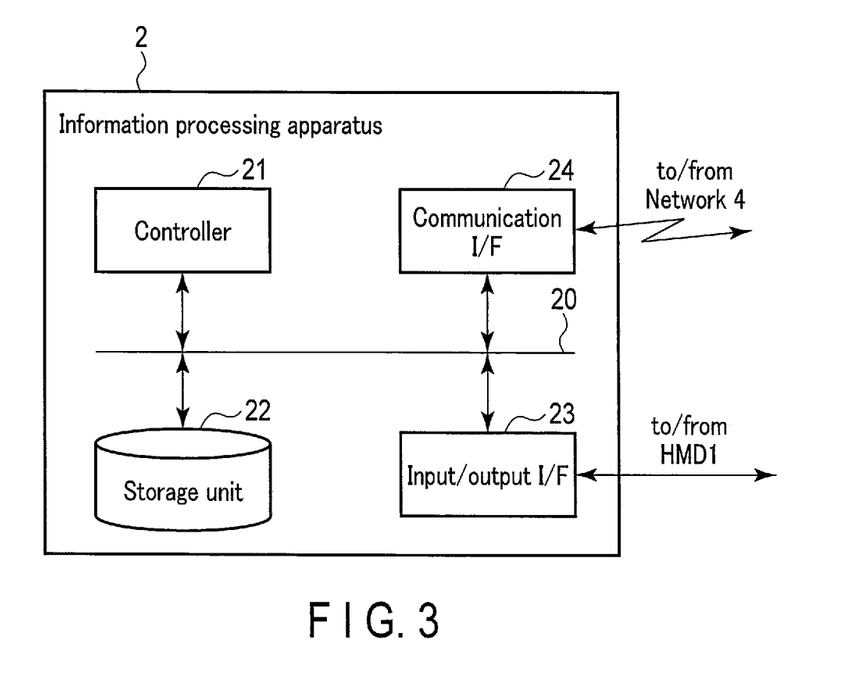
FIG. 3 is a block diagram illustrating a hardware configuration of an information processing apparatus used in the system illustrated in FIG. 1.
Figure 4:
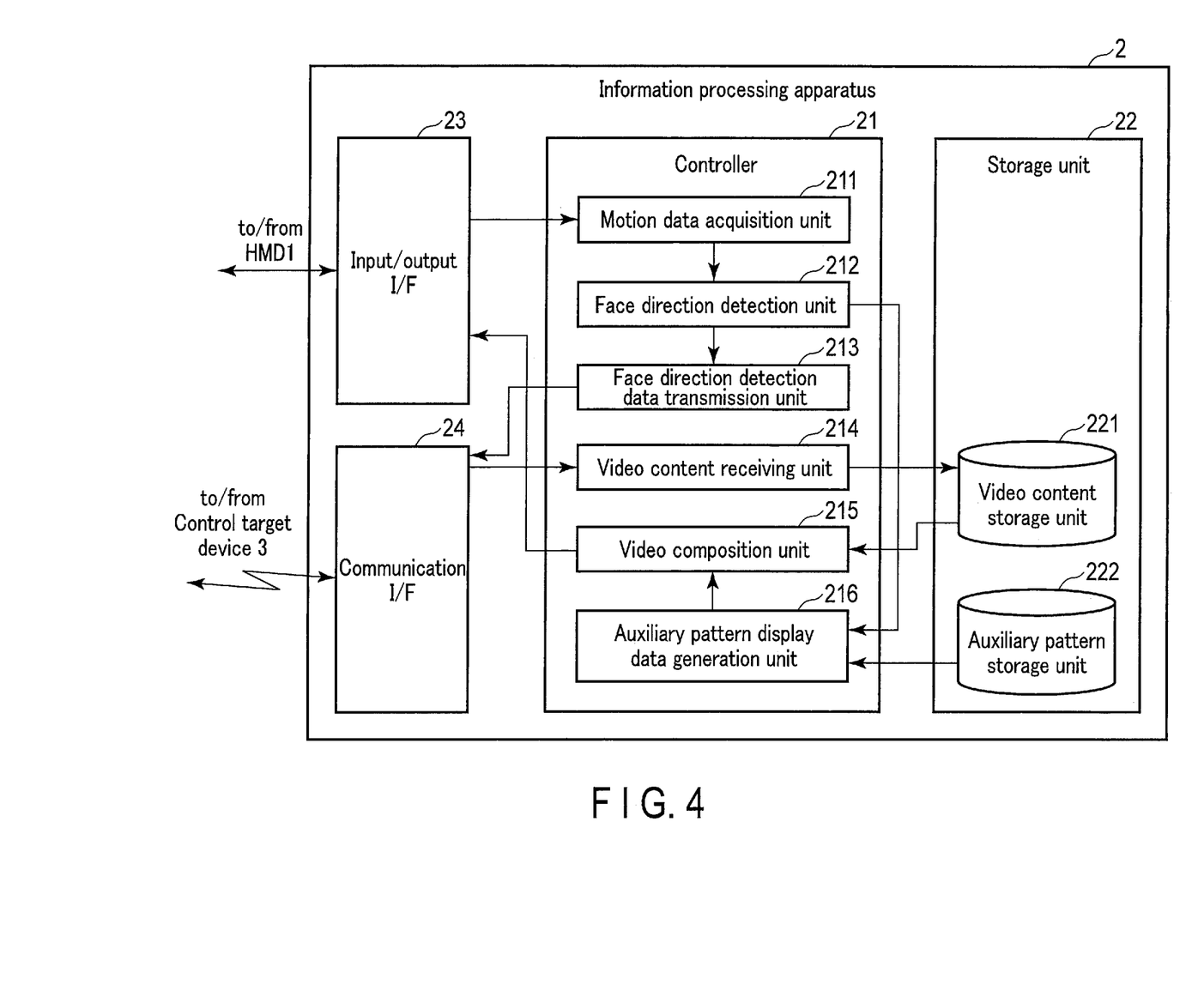
FIG. 4 is a block diagram illustrating a software configuration of the information processing apparatus used in the system illustrated in FIG. 1.

FIGS. 3 and 4 are block diagrams respectively illustrating hardware and software configurations of the information processing apparatus 2.

The information processing apparatus 2 includes, for example, a mobile information terminal such as a smartphone or a personal computer. The information processing apparatus 2 is structured such that a storage unit 22, an input/output interface (input/output I/F) 23, and a communication interface (communication I/F) 24 are connected via a bus 20 to a controller 21 having a hardware processor such as a CPU. The processor may include an integrated circuit, such as an application specific integrated circuit (ASIC) and a field programmable gate array (FPGA).

The head mount display 1 is connected to the input/output I/F 23. In addition, a controller or the like for remote control of the control target device 3 may be connected to the input/output I/F 23.

The communication I/F 24 includes an interface compatible with, for example, a wireless LAN, a short-range wireless data communication standard (for example, Bluetooth (registered trademark)), or a public mobile communication network, and transmits and receives data to and from the control target device 3 via the network 4. The communication I/F 24 may include an interface corresponding to a wired network such as a public wired network, a wired LAN, or a CATV network.

The storage unit 22 is structured as a storage medium by, for example, combining a non-volatile memory such as a hard disk drive (HDD) or SSD that can be written and read at any time, a non-volatile memory such as a ROM, and a volatile memory such as a RAM. The storage area of the storage unit 22 includes a program storage area and a data storage area. In the program storage area, in addition to middleware such as an operating system (OS), application programs necessary for executing various types of control processing according to the first embodiment of the present invention are stored.

A video content storage unit 221 and an auxiliary pattern storage unit 222 are provided in the data storage area. The video content storage unit 221 is used to temporarily store captured video data (hereinafter, also referred to as video contents) transmitted from the control target device 3. The auxiliary pattern storage unit 222 stores image data of an auxiliary pattern used for reducing VR sickness of the user. The auxiliary pattern and its display processing method will be described in detail later.

The controller 21 has a motion data acquisition unit 211, a face direction detection unit 212, a face direction detection data transmission unit 213, a video content receiving unit 214, a video composition unit 215, and an auxiliary pattern display data generation unit 216, as control functions for realizing the first embodiment of the present invention. All of these control functions are implemented by causing the hardware processor of the controller 21 to execute the application programs stored in the program storage area in the storage unit 22.

The motion data acquisition unit 211 performs a process of acquiring motion data representing the user's head motion detected by the sensor 16 from the head mount display 1 via the input/output I/F 23.

The face direction detection unit 212 performs a process of detecting changes in the direction of the user's face based on, for example, the acquired motion data. For example, based on the motion data, the face direction detection unit 212 performs a process of calculating changes in the pan direction and the tilt direction (angle) of the user's face. In addition to the pan direction and the tilt direction, the directions of the face to be detected may include other directions such as the tilt of the neck in the horizontal direction and the zoom direction.

If the head mount display 1 is provided with a camera that captures images of the user's face, the face direction detection unit 212 may have a function of detecting changes in the user's line-of-sight direction based on the video captured by the camera.

The face direction detection data transmission unit 213 performs a process of transmitting the face direction detection data obtained by the face direction detection unit 212 from the communication I/F 24 to the control target device 3 via the network 4.

The video content receiving unit 214 receives via the communication I/F 24 the video contents sent from the control target device 3 via the network 4, and performs a process of temporarily storing the video contents in the video content storage unit 221.

The auxiliary pattern display data generation unit 216 reads the image data of the auxiliary pattern from the auxiliary pattern storage unit 222, and generates image data such that the display position of the image data of the auxiliary pattern on the head mount display 1 follows in real time changes in the face direction detected by the face direction detection unit 212.

The video composition unit 215 generates a composite video in which the image data of the auxiliary pattern generated by the auxiliary pattern display data generation unit 216 is superimposed on the video content read from the video content storage unit 221, and transmits the composite video from the input/output I/F 23 to the head mount display 1.

Operation Example

Next, the operations of the remote control system configured as described above will be described focusing on the operations of the information processing apparatus 2.

Figure 5:
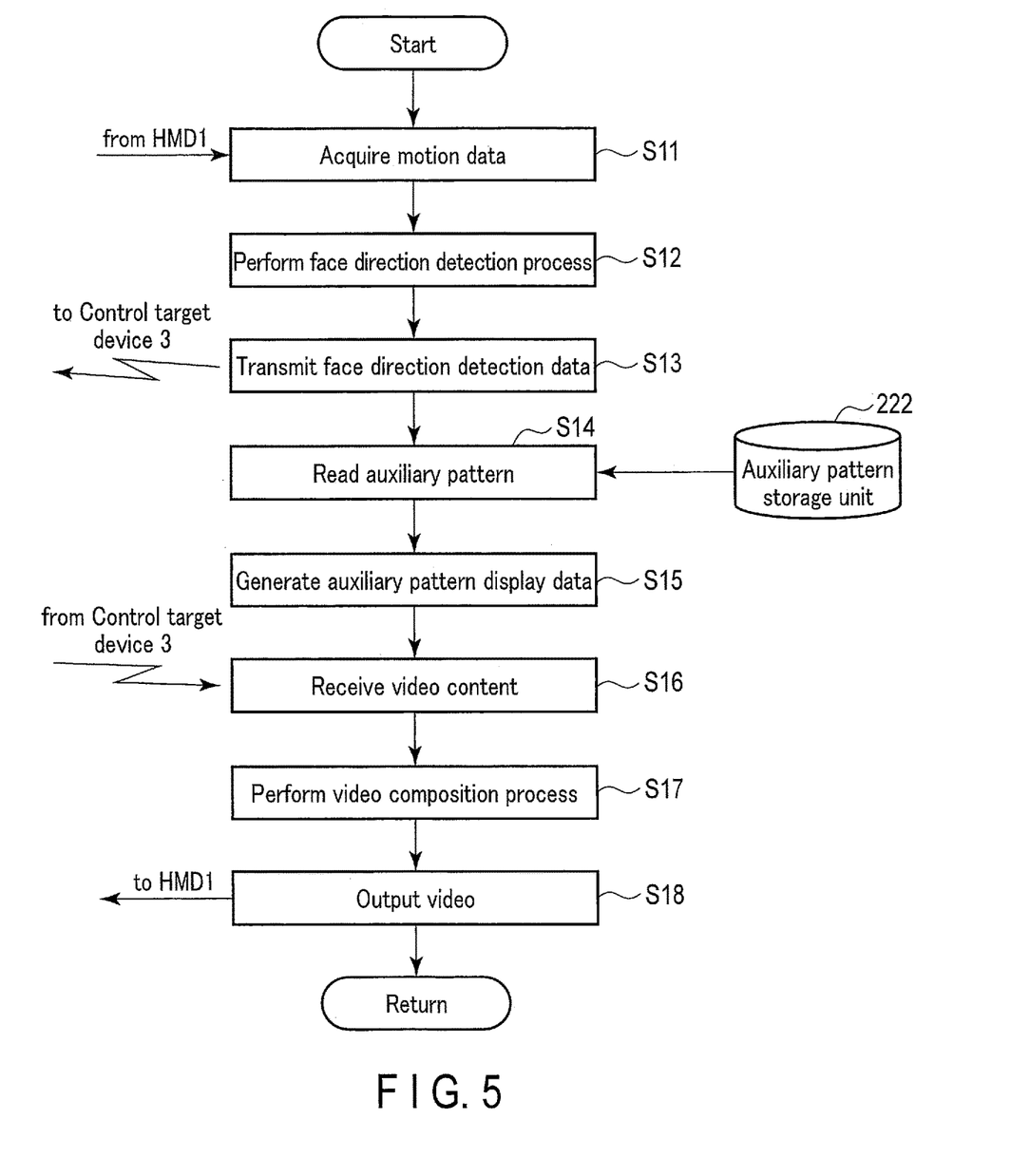
FIG. 5 is a flowchart illustrating a processing procedure and processing contents of video display control by the information processing apparatus illustrated in FIG. 4.

FIG. 5 is a flowchart illustrating a processing procedure and processing contents of video display control by the information processing apparatus 2.

(1) Storage of an Auxiliary Pattern

Figure 6A:
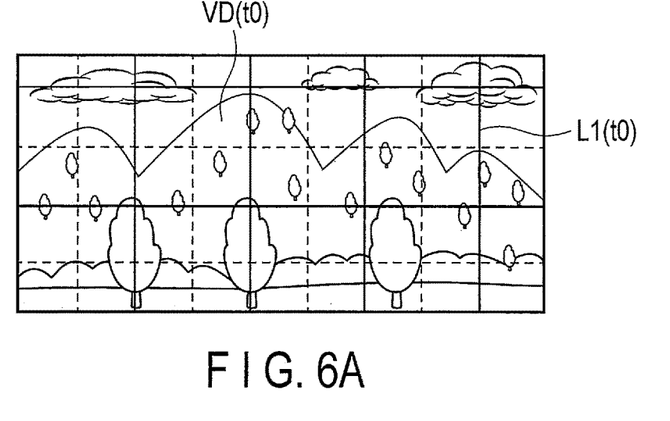
FIG. 6A is a diagram illustrating an example of a video displayed at time t0 by the video display control illustrated in FIG. 5.
Figure 6B:
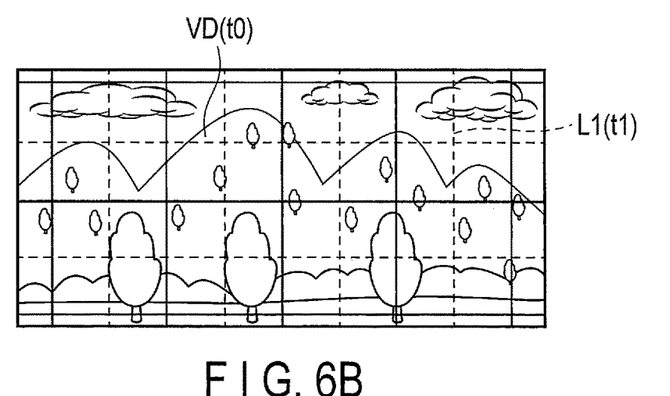
FIG. 6B is a diagram illustrating an example of a video displayed at time t1 by the video display control illustrated in FIG. 5.
Figure 6C:
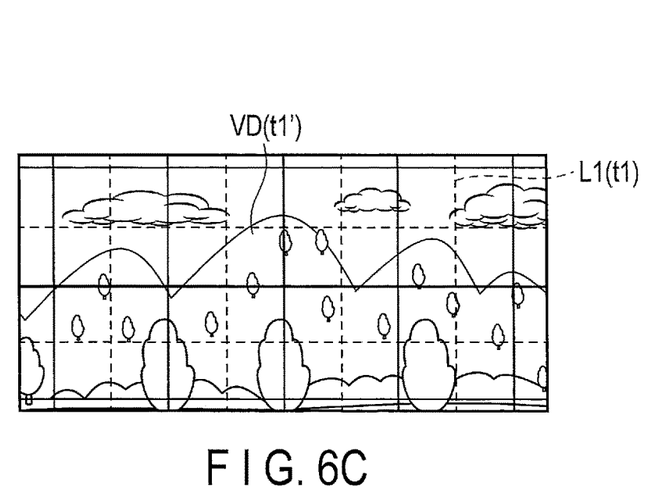
FIG. 6C is a diagram illustrating an example of a video displayed at time t1' by the video display control illustrated in FIG. 5.

Prior to the start of the operation, the system administrator uses, for example, his/her own terminal apparatus to generate an auxiliary pattern or acquire an auxiliary pattern from the outside, and stores image data of the auxiliary pattern in the auxiliary pattern storage unit 222. For example, as an auxiliary pattern, a grid-like linear pattern L1 including horizontal lines and vertical lines as illustrated in FIGS. 6A to 6C is generated.

In this example, a pattern in which solid lines and broken lines are arranged alternately is illustrated, but only solid lines or only broken lines may be used. The size of the grid, that is, the spacing between the lines, and the thickness, color, and density of the lines constituting the grid can be arbitrarily set. However, as the setting conditions, it is desirable to allow the user to recognize the auxiliary pattern while maintaining the visibility of the video content.

(2) Display Control of a Video Content Using the Auxiliary Pattern

When the system is started, the video content including the video captured by the camera on the head of the control target device 3 is transmitted to the information processing apparatus 2 via the network 4. This video content is received by the information processing apparatus 2 under the control of the video content receiving unit 214, then transferred from the video composition unit 215 to the head mount display 1 and displayed on the display unit 14.

In this state, it is assumed that the user moves his/her head to change the direction of his/her face. Then, the motion of the head is detected by the sensor 16 of the head mount display 1, and the motion data is input to the information processing apparatus 2. The information processing apparatus 2 acquires the motion data in step S11 under the control of the motion data acquisition unit 211, and detects the change in the user's face direction from the motion data under the control of the face direction detection unit 212 in step S12.

For example, the face direction detection unit 212 calculates a change in a vector indicating the direction of the user's face from a 6-axis angular velocity detection signal output from the angular velocity sensor (gyro sensor). The information processing apparatus 2 transmits the detection data indicating the change in the orientation of the user's face from the communication I/F 24 to the control target device 3 in step S13 under the control of the face direction detection data transmission unit 213.

When the control target device 3 receives the detection data of the face direction, the control target device 3 operates, for example, a servo mechanism to change the imaging direction of the camera based on the detection data of the face direction. As a result, the imaging target area by the camera changes, and the video content including the captured video of the imaging target area during and after the change is returned to the information processing apparatus 2.

On the other hand, the information processing apparatus 2 performs processing described below in a period of time from when the detection data of the user's face direction is transmitted to the control target device 3 until the video content including the captured video is returned from the control target device 3 in accordance with the detection data.

That is, the information processing apparatus 2 first reads the image data of the auxiliary pattern from the auxiliary pattern storage unit 222 in step S14 under the control of the auxiliary pattern display data generation unit 216. Then, under the control of the auxiliary pattern display data generation unit 216, in step S15, based on the detection data indicating the change in the direction of the user's face obtained in step S12, the information processing apparatus 2 generates image data such that the display position of the auxiliary pattern on the head mount display 1 follows in real time the detected change in the direction of the face.

The information processing apparatus 2 receives the video content returned from the control target device 3 in step S16 under the control of the video content receiving unit 214. Then, under the control of the video composition unit 215, in step S17, the information processing apparatus 2 superimposes the image data of the auxiliary pattern generated by the auxiliary pattern display data generation unit 216 on the video content returned from the control target device 3 to generate a composite video. Then, the information processing apparatus 2 outputs the data of the composite video from the input/output I/F 23 to the head mount display 1 in step S18.

As a result, on the head mount display 1, the composite video output from the information processing apparatus 2 is displayed on the display unit 14. The composite video is a video in which the image of the auxiliary pattern is superimposed on the video content returned from the control target device 3. The image of the auxiliary pattern is generated such that the display position changes in real time according to the change in the direction of the user's face.

The information processing apparatus 2 repeats the operations in steps S11 to S18 during the period of time in which the system is operating.

FIGS. 6A to 6C are diagrams for describing an example of a change in the display of a composite video on the head mount display 1.

First, at time t0, for example, as illustrated in FIG. 6A, a composite video in which the auxiliary pattern L1 (t0) is superimposed on a video content VD (t0) is displayed. In this state, it is assumed that the user moves his/her face diagonally to the upper left direction at time t1. Thus, the change in the direction of the user's face at this time is notified by the information processing apparatus 2 to the control target device 3, so that the imaging target area by the camera of the control target device 3 changes diagonally to the upper left direction. Then, the video content including the captured image according to the change in the imaging target area is returned to the information processing apparatus 2, and is displayed on the head mount display 1 by the information processing apparatus 2.

At this time, for the video content, after the change in the direction of the user's face started, the detection data is sent from the information processing apparatus 2 to the control target device 3 via the network 4. Then, the control target device 3 generates the video content corresponding to the detection data. This video content is transmitted to the information processing apparatus 2 via the network 4, undergoes auxiliary pattern composition processing in the information processing apparatus 2, and then is displayed on the head mount display 1. Thus, there occurs a drawing delay (latency) including a transmission delay before the video content reflecting the change in the direction of the user's face is displayed on the head mount display 1. Moreover, the delay amount of this drawing delay causes time fluctuation (jitter) due to the influence of network congestion degree and CPU load fluctuation. The drawing delay (latency) of this video content and jitter of the drawing delay (latency) are major causes of VR sickness for users.

However, in the first embodiment, the display position of the auxiliary pattern L1 (t0) moves on the display screen of the head mount display 1, so as to follow the change in the direction of the user's face in real time. FIG. 6B illustrates a display example of the video content VD (t0) and the auxiliary pattern L1 (t1) at this time.

Therefore, even if the change in the video content VD (t0) does not follow the movement of the direction of the user's face in real time, the display position of the auxiliary pattern L1 (t1) follows the movement of the direction of the user's face in real time. This reduces the effect of the drawing delay (latency) of the video content VD (t0), which suppresses the occurrence of VR sickness in the user.

FIG. 6C illustrates an example of the display results of the video content VD (t1') and the auxiliary pattern L1 (t1) after the lapse of time corresponding to the drawing delay. In this way, at the time t1' after the drawing delay, the display position of the video content VD (t1') catches up with the corresponding position after the change in the direction of the user's face.

(Actions and Effects)

As described above, in the first embodiment, the auxiliary pattern is stored in the storage unit 22 in the information processing apparatus 2 to which the head mount display 1 is connected. When the information processing apparatus 2 superimposes the above auxiliary pattern on the video content transmitted from the control target device 3 and displays it on the head mount display 1, the information processing apparatus 2 controls the display position of the auxiliary pattern to follow the change in the direction of the user's face in real time, based on the change in the direction of the user's face detected in accordance with detection signal of the motion of the user's head.

Therefore, even if the display position of the video content does not follow the change in the direction of the user's face in real time, the display position of the auxiliary pattern superimposed on the video content changes so as to follow the change in the direction of the user's face in real time. Therefore, even if a drawing delay (latency) including a transmission delay of the video content occurs or if the delay amount changes with time, that is, even if the drawing delay includes jitter, the influence of the drawing delay (latency) becomes unlikely to exert influence on the user, which makes it possible to reduce the occurrence of VR sickness of the user.

Moreover, in the first embodiment, the occurrence of VR sickness of the user is reduced by moving the display position of the auxiliary pattern stored in advance so as to follow the change in the direction of the user's face. For this reason, the processing load on the CPU in the apparatus can be kept low compared to the case where the reprojection processing is performed on the displayed image, which produces the effect of reducing VR sickness without using an expensive apparatus equipped with a CPU with high processing capacity.

Second Embodiment

An information processing apparatus 2 may have a function of monitoring the operating status of at least one of a head mount display 1, the information processing apparatus 2, and a control target device 3, and may display a message indicating the monitoring result by changing the display form of the auxiliary pattern.

For example, the information processing apparatus 2 monitors the remaining battery power of the head mount display 1 and the information processing apparatus 2. When detecting that the remaining battery power has reduced to a predetermined level or lower, the information processing apparatus 2 notifies the reduction in the remaining battery power by changing the display color, density, or shape of the auxiliary pattern. At that time, as the change pattern of the display form, a change pattern different from the change of the display form following the user's motion or operation, for example, blinking or the like may be used. In addition, the operating status of the head mount display 1, the information processing apparatus 2, and the control target device 3 may not be monitored based on the remaining battery power. For example, the operating status may be monitored based on other abnormal operating conditions such as abnormal signal cable connection, communication failure, abnormal operational state of the control target device 3.

[Modifications]

Various modifications of the present invention can be considered as below.

Figure 7:
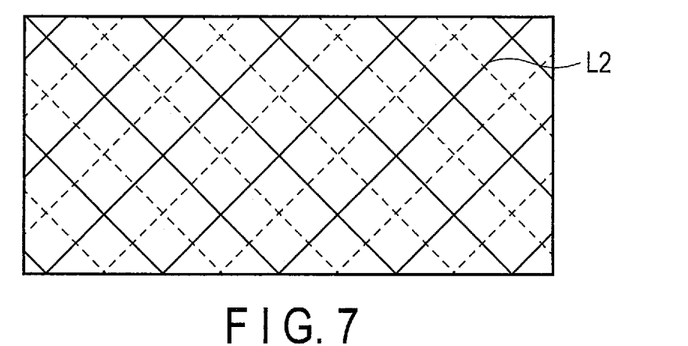
FIG. 7 is a diagram illustrating a display example of an auxiliary pattern in a modification (1) of the present invention.

(1) As an auxiliary pattern, for example, as illustrated in FIG. 7, a grid pattern L2 using a plurality of solid lines and broken lines in the diagonal direction with respect to the display screen may be used. In this case, the plurality of lines forming the grid may be only solid lines or only broken lines. The size of the grid, that is, the spacing between the lines, and the thickness, color, and density of the lines constituting the grid can be arbitrarily set.

Figure 8:
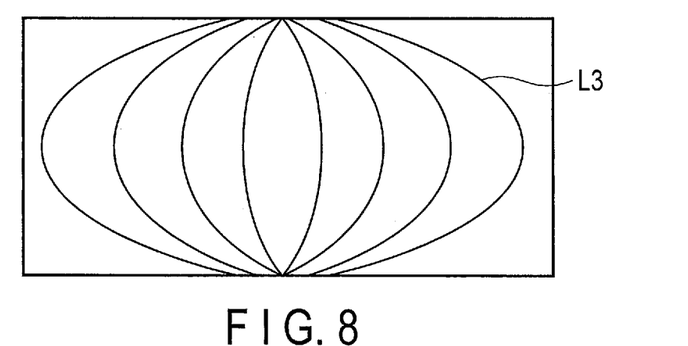
FIG. 8 is a diagram illustrating a display example of an auxiliary pattern in a modification (2) of the present invention.

(2) As an auxiliary pattern, for example, as illustrated in FIG. 8, a pattern L3 in which a plurality of arcuate lines is arranged like the longitude lines of the earth may be used. In this case as well, the spacing between the lines, and the thickness, color, and density of the lines can be arbitrarily set.

Figure 9:
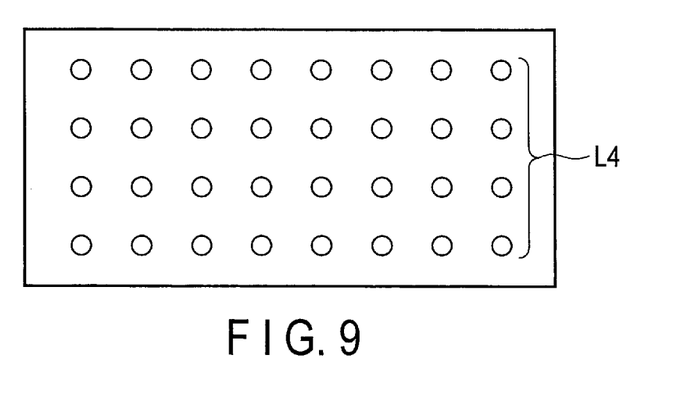
FIG. 9 is a diagram illustrating a display example of an auxiliary pattern in a modification (3) of the present invention.

(3) As an auxiliary pattern, for example, as illustrated in FIG. 9, a polka dot pattern L4 in which a plurality of circular dots is equally spaced in the two-dimensional direction may be used. In this case, the pattern may not include circles but may include ellipses or squares, and their size, color, density, and spacing can be arbitrarily set. Further, the number of dots may be one or more. When a plurality of dots is to be arranged, the spacing between the dots is not limited to equal but may be set randomly.

(4) As an auxiliary pattern, characters may be used in addition to graphics such as lines or circular dots. For example, when the video content is a game content, a character appearing in a scene of the game or a sub-character related the character are used. In this way, it is possible to reduce the occurrence of VR sickness while suppressing the user's feeling of strangeness about the auxiliary pattern.

(5) In the first embodiment, the display position of the auxiliary pattern is moved so as to follow the change in the direction of the user's face. Otherwise, for example, the color or density of the auxiliary pattern may be changed so as to follow the change in the direction of the user's face. This also reduces the influence of a drawing delay (latency) including a transmission delay of the video content and its jitter on the user, thereby alleviating the occurrence of VR sickness.

(6) In the first embodiment, the video display control has been performed by the information processing apparatus 2 provided separately from the head mount display 1. However, when the head mount display 1 has the function of the information processing apparatus 2, that is, when the head mount display integrated with the information processing apparatus is used, the video display control according to the present invention may be executed on the head mount display.

(7) The first embodiment has been described above on the premise that the video content transmitted from the control target device 3 existing in a remote location is displayed. However, the present invention is not limited to this premise. The present invention may be applied to systems in which video contents change depending on the user's action or operation, such as game contents, tourist destination introduction contents, exhibition contents in museums or art museums, real estate introduction contents, and the like. Even in such a case, by compositing the auxiliary pattern according to the present invention with the video content in the head mount display or the information processing apparatus attached thereto, it is possible to reduce the influence of a drawing delay (latency) including a transmission delay in displaying the video content and its jitter, thereby alleviating the user's VR sickness.

(8) The type and configuration of the head mount display, the configuration of the information processing apparatus as the video display control apparatus, the type of the video content, the configuration of the auxiliary pattern, and the display control processing procedure and processing content thereof can be modified in various ways without departing from the scope of the present invention.

In short, the present invention is not limited to the above embodiments as they are, and in the implementation stage, the components can be embodied in modified manners without departing from the scope of the present invention. In addition, various inventions can be formed by appropriately combining the plurality of components disclosed in the above embodiments. For example, some components may be removed from all the components illustrated in the embodiments. Further, components from different embodiments may be combined as appropriate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

What is claimed is:

1. A video display control apparatus that receives a video content generated by a control target device in accordance with a control operation of a user via a network with a transmission delay and displays the received video content on a head mount display attached to the user, comprising:
 a detection unit configured to detect a change in a direction of one of face and line of sight related to the control operation of the user;
 a communication unit configured to transmit the change in a direction of one of face and line of sight related to the control operation of the user to the control target device via the network with the transmission delay, and configured to receive a video content from the control target device via the network with the transmission delay, the video content being generated by the control target device and following the change; and a first display control unit configured to, before the communication unit receives the video content generated following the change, generate an auxiliary pattern which changes so as to follow the change in the direction of the one of the face and the line of sight related to the control operation of the user detected by the detection unit, configured to superimpose the auxiliary pattern on an already-received video content that has already been received at time the auxiliary pattern is generated, and configured to display the already-received video content with the auxiliary pattern on the head mount display, wherein the video content generated by the control target device and the auxiliary pattern generated by the first display control unit are the video content and the auxiliary pattern in which the same position change according to the detected change is added to the video content and auxiliary pattern generated one before the video content generated by the control target device and the auxiliary pattern generated by the first display control unit, the already-received video content is a video content generated so as to follow a change in a time prior to the detected change by effect of the transmission delay, and the video display control apparatus further comprising a second display control unit configured to (i) receive a detection result of an operating status that is at least one of a remaining battery power, abnormal signal cable connection, communication failure and abnormal operational state of at least one of the video display control apparatus and the head mount display and (ii) change the auxiliary pattern generated by the first display control unit in a change pattern different from a change of the display form following the change in the direction of the one of the face and the line of sight related to the control operation of the user.

2. The video display control apparatus according to claim 1, wherein the first display control unit is configured to further change at least one of a display color and a display density of the auxiliary pattern so as to follow the change in the direction of the one of the face and the line of sight related to the control operation of the user.

3. The video display control apparatus according to claim 1, wherein the first display control unit is configured to generate the auxiliary pattern including at least one of horizontal, vertical, diagonal, and curved line patterns on a display screen of the head mount display.

4. The video display control apparatus according to claim 3, wherein the first display control unit is configured to further change at least one of a display color and a display density of the auxiliary pattern so as to follow the change in the direction of the one of the face and the line of sight related to the control operation of the user.

5. The video display control apparatus according to claim 1, wherein the first display control unit generates a pattern image including a circle, an ellipse, a square, or a character as the auxiliary pattern.

6. The video display control apparatus according to claim 5, wherein the first display control unit is configured to further change at least one of a display color and a display density of the auxiliary pattern so as to follow the change in the direction of the one of the face and the line of sight related to the control operation of the user.

7. The video display control apparatus according to claim 1, wherein the second display control unit is configured to, based on the detection result of the operating status of at least one of the video display control apparatus and the head mount display, further change at least one of a display color, a display density, a display shape, and a blinking display of the auxiliary pattern generated by the first display control unit.

8. A video display control method executed by a video display control apparatus that receives a video content generated by a control target device in accordance with a control operation of a user via a network with a transmission delay and displays the received video content on a head mount display attached to the user, the video display control method comprising:

detecting a change in a direction of one of face and line of sight related to the control operation of the user;

transmitting the change in a direction of one of face and line of sight related to the control operation of the user to the control target device via the network with the transmission delay, and receiving a video content from the control target device via the network with the transmission delay, the video content being generated by the control target device and following the change;

before receiving the video content generated following the change, generating an auxiliary pattern which changes so as to follow the detected change in the direction of the one of the face and the line of sight related to the control operation of the user;

superimposing the auxiliary pattern on an already-received video content that has already been received at time the auxiliary pattern is generated; and displaying the already-received video content with the auxiliary pattern on the head mount display, wherein the video content generated by the control target device and the generated auxiliary pattern are the video content and the auxiliary pattern in which the same position change according to the detected change is added to the video content and auxiliary pattern generated one before the video content generated by the control target device and the generated auxiliary pattern, the already-received video content is a video content generated so as to follow a change in a time prior to the detected change by effect of the transmission delay, and the video display control method further comprising (i) receiving a detection result of an operating status that is at least one of a remaining battery power, abnormal signal cable connection, communication failure and abnormal operational state of at least one of the video display control apparatus and the head mount display and (ii) changing the generated auxiliary pattern in a change pattern different from a change of the display form following the change in the direction of the one of the face and the line of sight related to the control operation of the user.

9. The video display control method according to claim 8, further comprising, based on the detection result of the operating status of at least one of the video display control apparatus and the head mount display, further changing at least one of a display color, a display density, a display shape, and a blinking display of the auxiliary pattern generated in the generating the auxiliary pattern.

10. A non-transitory computer readable medium storing a program that causes a hardware processor of a video display control apparatus that receives a video content generated by a control target device in accordance with a control operation of a user via a network with a transmission delay and displays the received video content on a head mount display attached to the user, to:

detect a change in a direction of one of face and line of sight related to the control operation of the user;

transmit the change in a direction of one of face and line of sight related to the control operation of the user to the control target device via the network with the transmission delay, and receive a video content from the control target device via the network with the transmission delay, the video content being generated by the control target device and following the change;

before receiving the video content generated following the change, generate an auxiliary pattern which changes so as to follow the detected change in the direction of the one of the face and the line of sight related to the control operation of the user;

superimpose the auxiliary pattern on an already-received video content that has already been received at time the auxiliary pattern is generated; and display the already-received video content with the auxiliary pattern on the head mount display, wherein the video content generated by the control target device and the generated auxiliary pattern are the video content and the auxiliary pattern in which the same position change according to the detected change is added to the video content and auxiliary pattern generated one before the video content generated by the control target device and the generated auxiliary pattern, the already-received video content is a video content generated so as to follow a change in a time prior to the detected change by effect of the transmission delay, and the hardware processor being configured to (i) receive a detection result of an operating status that is at least one of a remaining battery power, abnormal signal cable connection, communication failure and abnormal operational state of at least one of the video display control apparatus and the head mount display and (ii) chance the auxiliary pattern generated by the first display control unit in a change pattern different from a change of the display form following the change in the direction of the one of the face and the line of sight related to the control operation of the user.

* * * * *